235-379 SR
2/22/83 XR 4,375,032

United States Patent [19]

Uchida

[11] 4,375,032

[45] Feb. 22, 1983

[54] TRANSACTION PROCESSING SYSTEM

[75] Inventor: Yasuo Uchida, Takatsuki, Japan

[73] Assignee: Omron Tateisi Electronics Co., Kyoto, Japan

[21] Appl. No.: 231,845

[22] Filed: Feb. 5, 1981

[30] Foreign Application Priority Data

Feb. 7, 1980 [JP] Japan .................................. 55-15070

[51] Int. Cl.$^3$ .......................... G06K 5/00; H04Q 3/00

[52] U.S. Cl. .................................... 235/380; 235/379; 235/381; 235/382; 340/825.33

[58] Field of Search ............... 235/379, 380, 381, 382; 340/825.33, 825.35, 286

[56] References Cited

U.S. PATENT DOCUMENTS 3,863,245 1/1975 Swinamer et al. .................. 340/286

3,941,977 3/1976 Voss .................................. 235/379

*Primary Examiner*—Harold I. Pitts

*Attorney, Agent, or Firm*—Cushman, Darby & Cushman

[57] ABSTRACT

There is provided a transaction processing system including a terminal machine for automatic cash transactions initiated with record media possessed by users, comprising means for reading data on record media inserted by users, means for detecting if the read data are related to certain data representing a theft or the like, and means for delaying transactions by a predetermined time period when the detecting means has detected that the read data are related to said certain data.

3 Claims, 7 Drawing Figures

TRANSACTION PROCESSING SYSTEM

BRIEF SUMMARY OF THE INVENTION

This invention relates to a transaction processing system involving a terminal machine such as a bank service machine, e.g. an automatic cash dispensing unit, an automatic money deposit-withdrawal unit and so on.

In a transaction processing situation such as the above, each transaction is initiated with a record medium such as a card or deposit passbook but if the card or deposit passbook is stolen, for instance, it may arise that the deposited money is withdrawn by others using the stolen card or passbook.

The usual deterrent to such a practice is to have the account number of the card or passbook registered on a theft file as soon as a theft is found, and recover the card or passbook and stop the transaction when such a stolen card or book is employed or have the offender arrested by security personnel in the course of the transaction.

However, if the transaction is suspended which underway, the offender may take cognizance and escape. Thus, informing the security personnel in the course of the transaction is not an effective measure nowadays because of the high processing speed of transactions that has been made possible by recent technological advances thus giving the offender enough time for completing the transaction and running away with the money.

Against the above background, this invention has as its object to provide a new transaction processing system which, when the card or passbook has been stolen and used in the transaction, will detain the offender at the transaction machine for a sufficient time without giving him notice and time to escape.

In accordance with this invention, there is provided a transaction processing system including a terminal machine for automatic cash transactions initiated with record media possessed by users comprised of means for reading data on record media inserted by users, means for detecting if the read data is related to certain data representing a theft or the like, and means for delaying transactions by a predetermined time period when the detecting means has detected that the read data is related to said certain data. Thus, if the data of the record medium entered into the transaction processing system is detected to be a certain data, e.g. data of a stolen card, the transaction is delayed by a certain time period in such a manner that the offender may be convinced that his transaction is still in progress and will be detained at the transaction system, thus allowing a time in which the security personnel may rush to the site and arrest the offender.

This invention, having the above novel feature, will now be described by way of a preferred embodiment, reference being had to the accompanying drawings depicting an automatic cash withdrawl system connected on line to a control center.

DETAILED DESCRIPTION

Figure 1:
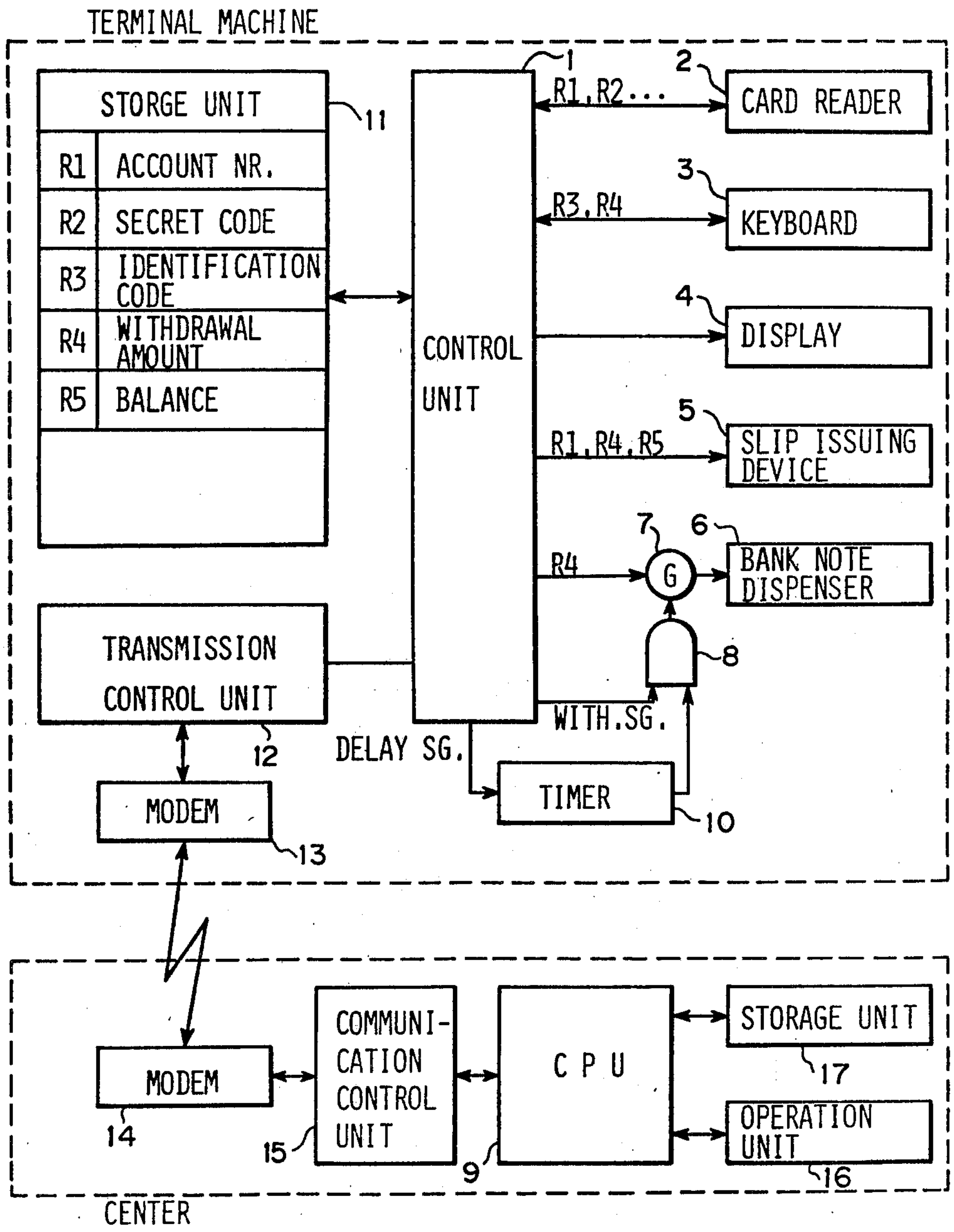
FIG. 1 is a block diagram showing the main construction of a cash withdrawal system according to this invention.

Referring, now, to FIG. 1, there is shown a cash withdrawal system comprising a cash withdrawal machine as a terminal of the system and a center connected with the terminal. A control unit 1 may for example be a microprocessor which controls all circuit devices and performs computations. A card reader 2, on entry of a card (not shown) reads the data magnetically recorded on the card, e.g. the account no., secret code or/and the like, and, when the data includes a balance datum, writes for updating the balance. A keyboard 3 is provided for inputting the identification code and the withdrawal amount demanded. There is also a display 4 which indicates the steps to be taken by the user of the machine, stepwise progress of processing, withdrawal amount and other information.

A slip issuing device 5 is such that, when cash is dispensed, it prints and issues a receipt carrying such information as the account No., withdrawal amount and balance amount. A bank note dispenser 6 dispenses the notes equivalent to the demanded withdrawal amount as its gate 7 opens.

An AND-gate 8 controls the gate 7 by its output. This AND-gate 8 generates an output in response to an outlay instruction from a central processing unit (CPU) 9 and the output of a timer 10. There is usually an output at the timer 10 and this output is delayed on arrival of, and in accordance with, a delay instruction from the CPU 9. Such a delay instruction is transmitted when, for, example, the card used by the user of the machine was detected to be a stolen or lost card.

A storage unit 11 is for writing and reading various data and includes Area R1 for account No., Area R2 for secret code, Area R3 for identification code, Area R4 for withdrawal amount and Area R5 for outstanding balance.

A transmission control circuit 12 connects this cash withdrawal machine, which is a terminal machine, to the CPU 9, on line via MODEM's 13, 14 and a communication control unit 15 for the reception and transmission of data.

To the above-mentioned CPU 9 is connected an operation unit 16 at which the numbers (account No.) of stolen and lost cards are inputted, such card number data being stored in a storage unit 17.

Figure 2:
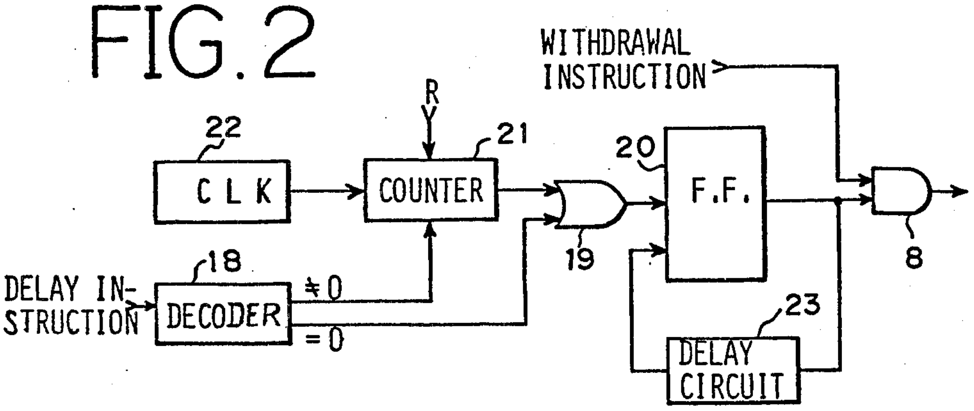
FIG. 2 is a timer control block diagram for the system of FIG. 1.

Referring to FIG. 2 which shows a detailed construction of said timer 10, the delay instruction from the CPU 9 is a 3-digit binary signal, for instance, and a decoder 18 decodes the delay index of the delay instruction.

The above-mentioned delay index is such that, when it is "0", the decoder signal sets a flip-flop 20 via an OR-gate 19. On the other hand, when the delay index is any numeral other than "0", the initial value of a counter 21 is set and that index value at the pulses from a clock-pulse generator 22 are counted. And when the counter 21 has counted down to "0", the resulting count-up signal sets the flip-flop 20 via the OR-gate 19.

The setting signal of this flip-flop 20 is applied to the AND-gate 8 and, in association with the outlay instruction signal mentioned before, opens the AND-gate and, consequently, the gate 7 of the bank note dispenser 6.

A delay circuit 23 holds the flip-flop 20 for a time necessary for opening of the gate 7 and resets the flip-flop 20 after a lapse of the set time. This circuit 23 and said flip-flop 20, taken together, constitutes a one-shot multivibrator.

In this connection, it may be so arranged that the resetting of said flip-flop 20 is effected on command from the control circuit 1 or upon detection of the completion of dispensing of the money.

Thus, the delay of the transaction in response to a delay instruction is effected by setting the initial value of the counter 21 using its delay index and delaying the setting of the flip-flop 20 with the delay time being dictated by the initial setting of the counter 21 in accordance with the delay index.

Figure 3:
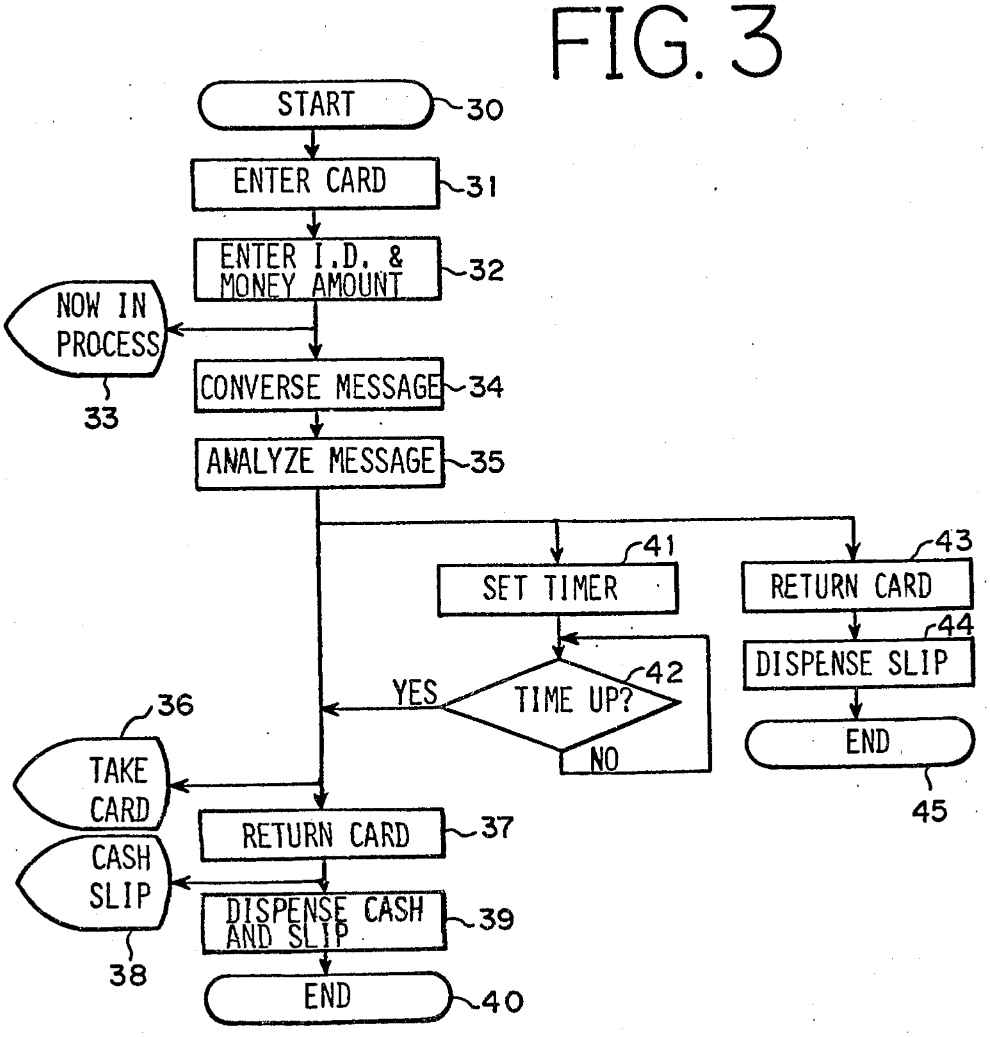
FIG. 3 is a flow chart of the main routine for the same system.

The outlay function of the transaction processing system according to this invention will be described below with reference to FIG. 3. When the card or passbook is entered into the cash withdrawal machine (Step 31), the card reader 2 reads the card data and the account No. and secret code are stored in Area R1 and Area R2, respectively, of the storage unit 11.

The control circuit 1 searches Areas R2 and R3 of the storage unit 11 to check data corresponding to the secret code and identification code and if a correspondence is found between the card and the user, the display 4 shows an indication such as "In process . . . Please wait for a while" (Step 33) and, at the same time, a message is edited and sent to the center 9 (Step 34).

Figure 4A:
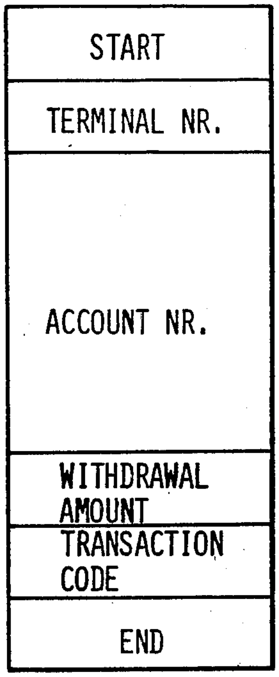
FIG. 4 A and B are views illustrating the forward and backward messages.
Figure 4B:
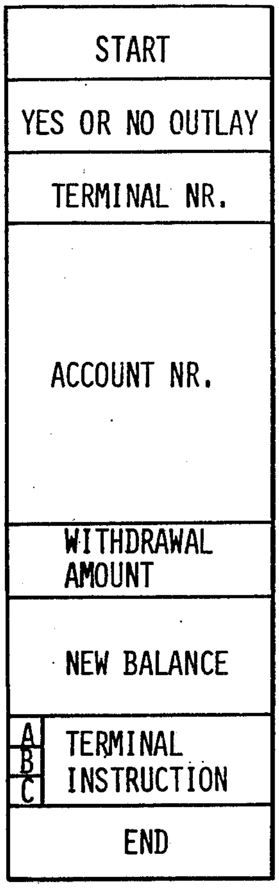

As illustrated in FIG. 4 A, this backward (directed to center 9) message includes the terminal unit No., account No., withdrawal amount and transaction code. The terminal unit No. is a code number assigned to the particular cash withdrawal machine, and the transaction code is a code specifying whether the transaction is a cash withdrawal, balance enquiry or cash deposit, for example, and, in this instance, means a code indicating a withdrawal transaction.

The CPU 9 searches the file, as mentioned above, according to the account No. of the backward message to see whether there is the corresponding account, a balance sufficient enough to take care of the withdrawal amount, or a notification of a loss or theft of the corresponding card from the true owner of the card.

A forward (from center 9 to terminal machine) message, as illustrated in FIG. 4 B, includes a YES or NO of outlay, terminal No., Account No., withdrawal amount, new balance, and terminal instructions A, B and C. A YES of outlay occurs when there exists both the corresponding account number and a liquidatable balance, i.e. a balance which warrants the payment of the demanded withdrawal amount, and this data becomes a withdrawal instruction signal. On the other hand, even if there exists the corresponding account, a NO of outlay occurs when the balance is not sufficient to take care of the withdrawal demand. The outlay instruction amount is equal to the withdrawal amount demanded and an outlay of a sum equivalent to the amount is effected. The new balance is the balance outstanding after the withdrawal of said sum. The terminal instruction A may be a message saying that the terminal unit is functioning properly or an error has occurred at the terminal or an instruction to stop the operation at the terminal. The terminal instruction B is an instruction to recover or return the card and the terminal instruction C is a delay instruction in the form of index data.

The above delay instruction is a stepwise index such that the delay time is set for example in units of 20 seconds. By way of illustration, "000" is an index of "0" which instructs a normal transaction, "001" is an index of 1 which dictates a delay of 20 seconds, "010" is an index of 2 which dictates a delay of 40 seconds, "011" is an index of 3 which dictates a delay of 60 seconds, and so on. Such a delay index is applied when the card has been memorized in the storage unit 17 connected to the CPU 9 as a stolen or lost card.

As the forward message edited as above is transmitted to the terminal cash withdrawal machine, the control circuit 1 analyzes the message (Step 35).

If the forward message includes a NO of outlay data, no outlay instruction signal is outputted to the AND-gate 8 and, consequently, the bank note dispenser 6 is not actuated. The card reader 2 returns the card (Step 43) and the slip issuing device 5 prints the account No. and balance value and issues the receipt (Step 44) to complete the withdrawal transaction.

When the forward message includes a YES of outlay data, an outlay signal is outputted to the AND-gate 8. At the timer 10, its decoder 18 checks if a delay index exists in the terminal instruction C.

When the above delay index is zero, it represents the normal transaction and, accordingly, a normal withdrawal transaction is consumated. Thus, the "0" signal from the decoder 18 sets the flip-flop 20 and this output is applied to the AND-gate 8, whereupon an output is generated from the AND-gate 8 to open the gate 7. Thus, the flow directly proceeds from Step 35 to Step 37.

The display 4 shows an indication that the card is receivable (Step 36), the card reader 2 returns the card (Step 37), then the display 4 shows an indication that the cash and a receipt are now available to the client (Step 38); the bank note dispenser 6 dispenses cash corresponding to the withdrawal amount stored in Area R4 of the storage unit 11, and the slip issuing device 5 prints the account No., withdrawal amount and new balance on a receipt format and issues the receipt (Step 39) to complete the withdrawal transaction (Step 40).

When the above-mentioned delay index is a numeral other than zero, it indicates that the card used is a stolen or lost card. In such cases, the outlay procedure must be prolonged to retain the user of the card at the withdrawal machine until arrival of security personnel.

The above-mentioned delay index is read by the decoder 18 of the timer 10 and the initial value of the counter 21 is set in accordance with the decoded data so that the setting of the flip-flop 20 is delayed by the set time (Step 41). As a result, the dispensing action of the bank note dispenser 6 is delayed by the time delay for setting the flip-flop 20 (Step 42). Since, during this delay time, the display 4 keeps displaying an indication that the transaction is still in process, the card user can be detained without his knowledge of what is actually going on. During this delay time, the security personnel is notified of the case from the monitor so that the card user can be apprehended for confiscation of the card.

On the other hand, after elapse of the delay time, the flip-flop 20 is automatically set and a YES response is generated in Step 42. Thereafter, as in the normal outlay procedure, the card, bank notes and receipt are dispensed to complete the withdrawal transaction.

Figure 5:
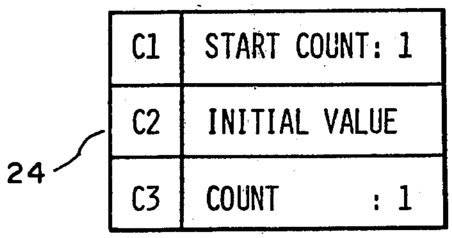
FIG. 5 is an explanatory view illustrating a modified storage unit.
Figure 6:
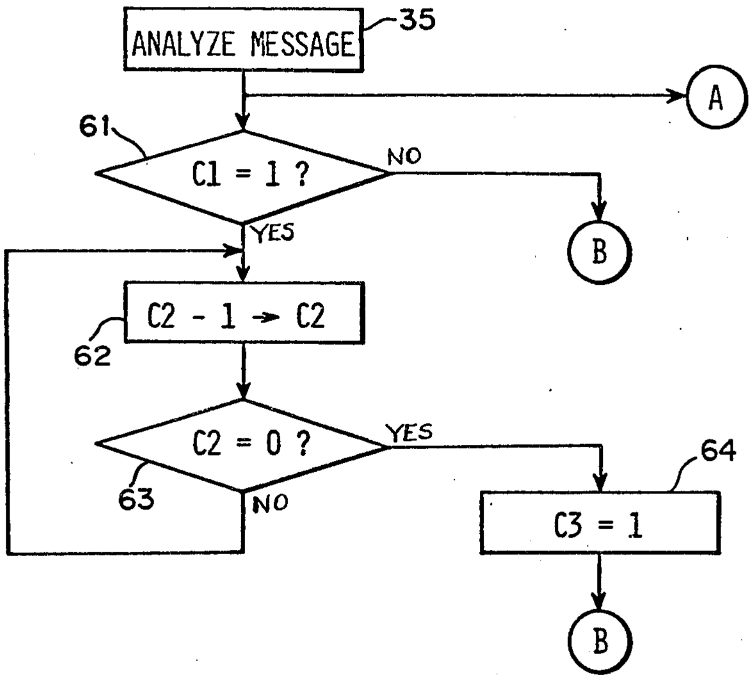
FIG. 6 is a flow chart of the subroutine.

FIG. 5 and 6 depict another embodiment of this invention in software formats. The processing subroutine illustrated in FIG. 6 performs the delay operation in lieu of Steps 41 and 42 of the main routine described with reference to FIG. 3.

A storage unit 24, in FIG. 5, is a substitute for the gate 7, gate 8 and timer 10 of FIG. 1. An Area C1 of this storage unit stores the numeral "0" when the delay index from the CPU 9 is zero and the operation is a usual withdrawal transaction but when said index is other than zero, which means a delay operation, Area C1 of the storage unit 24 stores the numeral "1". The delay operation is performed by testing for this numeral "1" (Step 61).

An Area C2 of said storage unit 24 stores an initial value of the counter which corresponds to the delay index and the counter is set with this initial value. An Area C3 stores "1" on count-up of the counter, and in accordance with this datum "1", the dispensing of bank notes after the delay operation is commenced in the main routine.

Thus, in this delay operation, an enquiry is made if the datum in Area C1 of the storage unit 24 is "1" or not and when it is "0", the dispensing of bank notes takes place as a normal transaction. Thus, the flow proceeds to Step 37.

If the datum is "1", which signifies a delay operation, the datum in Area C2 is set as the initial value of the counter and each time the counter counts down, "1" is subtracted from the initial value (Step 62). However, the subtraction at Step 62 includes the delay operation.

When the value in Area C2 has reached "0" (Step 63), "1" is stored in Area C3 (Step 64) and the flow proceeds to Steps 36 and 37 in the main routine so as to effect a dispensing of bank notes.

In this manner, the action of dispensing bank notes is delayed until the initial value in Area C2 reaches "0".

The foregoing description of preferred embodiments of this invention pertains to an on-line mode of processing but similar functions and results can also be accomplished off-line. And as to the delay operation, the transmission of the forward (center to terminal) message may be delayed by a predetermined time.

Further, instead of delaying the outlay action, the opening of the dispenser gate may be delayed. Such a delay may also be implemented at some other junction within the system, for example by delaying the dispensing of the card or passbook or verification of the secret code at the center.

When delay times are stepwise provided as in the foregoing embodiments, a common delay time can be established even when the terminal transaction machines vary in cash outlay time and, moreover, even a change of the delay time can also be made easily.

Furthermore, the cash withdrawal machine generally has a maximum limit set on withdrawal amount per transaction. In the case of a stolen card, several withdrawals are likely to be demanded. In such cases, the total time may be delayed by several minutes after one or two transactions.

It should be understood that the above description is merely illustrative of the present invention and that many changes and modifications may be made by those skilled in the art without departing from the scope of the appended claims.

What is claimed is:

1. A transaction processing system including a terminal machine for automatic cash transactions initiated with record media inserted by user, comprising:

- means for reading data on said record media inserted by users,
- means for storing data representative of unvalid record media,
- means for comparing said read data to said stored data,
- means for delaying said transactions by a predetermined time period sufficient to provide notification of invalidity when said comparing means has detected that said read data is related to said stored data, and means for completing the cash transactions whether or not there is a delay.

2. A transaction processing system according to claim 1 wherein said transaction processing system consists of at least one terminal machine and a processing center, said processing center producing messages intended for said terminal machine, and including means for inserting delay instruction data commanding a delay of transaction in said message from said processing center to said terminal machine.

3. A transaction processing system according to claim 1 or 2 wherein said terminal machine is a cash withdrawal machine.

* * * * *